US008005578B2

(12) United States Patent
Sheu

(10) Patent No.: US 8,005,578 B2
(45) Date of Patent: Aug. 23, 2011

(54) REMOTE CONTROL METHOD FOR A MOTION HEADING BY REFERING TO AN ANGLE BETWEEN A RECEIVING END AND A TRANSMISSION END

(75) Inventor: Yih-Ran Sheu, Yung Kang (TW)

(73) Assignee: Southern Taiwan University, Tainan County (TW)

( * ) Notice: Subject to any disclaimer, the term of this patent is extended or adjusted under 35 U.S.C. 154(b) by 293 days.

(21) Appl. No.: 11/898,387

(22) Filed: Sep. 12, 2007

(65) Prior Publication Data

US 2009/0069955 A1 Mar. 12, 2009

(51) Int. Cl.
*G05D 1/00* (2006.01)

(52) U.S. Cl. .............. 701/2; 701/23; 701/200; 701/300; 434/32

(58) Field of Classification Search .................. 701/1, 2, 701/3, 14, 36, 200, 224, 300; 434/1, 29, 434/30, 32; 446/491; 455/456.1, 132, 134, 455/136

See application file for complete search history.

(56) References Cited

U.S. PATENT DOCUMENTS

| | | | | |
|---|---|---|---|---|
| 5,481,257 | A * | 1/1996 | Brubaker et al. | 340/825.69 |
| 5,602,568 | A * | 2/1997 | Kim | 345/158 |
| 5,668,629 | A * | 9/1997 | Parker et al. | 356/139.05 |
| 7,425,918 | B2 * | 9/2008 | Rastegar et al. | 342/173 |
| 2002/0033803 | A1 * | 3/2002 | Holzrichter et al. | 345/158 |
| 2007/0001051 | A1 * | 1/2007 | Rastegar et al. | 244/3.1 |
| 2007/0080940 | A1 * | 4/2007 | Aoki et al. | 345/158 |
| 2008/0174488 | A1 * | 7/2008 | Weinstein et al. | 342/377 |

* cited by examiner

*Primary Examiner* — Mark Hellner
*Assistant Examiner* — Helal A Algahaim
(74) *Attorney, Agent, or Firm* — Rosenberg, Klein & Lee

(57) ABSTRACT

A method to control a motion heading at a receiving end by referring to an angle between the receiving end and a transmission end includes the following steps solving an angle, α, between an original heading and a user inputted direction of transmission end; having a signal-receiving unit at the receiving end to pick up signals sent from the transmission end; determining a signal source orientation according to strength of the signals received by the signal-receiving unit which comprises multiple sensors or a position sensitive device arranged in a form to pick up the signals from the transmission end; solving an angle, β, between the signal source orientation and an original motion heading of the receiving end; and solving a new motion heading according to the angles αand β.

7 Claims, 6 Drawing Sheets

REMOTE CONTROL METHOD FOR A MOTION HEADING BY REFERING TO AN ANGLE BETWEEN A RECEIVING END AND A TRANSMISSION END

BACKGROUND OF THE INVENTION (a) Field of the Invention

The present invention relates to a method to remote control a motion heading by referring to an angle between a receiving end and a transmission end, and more particularly, to a method for performing an angular computation based on signals of the relative angle picked up by the receiving end to generate a new motion heading identical with that set up by the transmission end.

(b) Description of the Prior Art

A remote control device to control motion heading of a target object (a power toy, robot vehicle, etc.) usually contains a transmission end and a receiving end. Taking an RC model car for example, a remote controller is the transmission end; and the model car, the receiving end. A joystick provided on the remote controller executes remote control over advancing, reversing, and taking turns of the model car. However, the moving control of all RC model cars generally available in the market is done by having the head of the car as a reference direction; therefore, a player is frequently caught in an awkward situation that the car moves in opposite direction to that as commanded by the joystick. That is, with the head of the model car facing the player, the player wants the car to take a right turn and naturally operate the joystick by pulling it to the right of the player and it winds up that the car is actually taking a left turn leading to that the car is tramped by barrier or damaged due to accidental collision when the car is moving in a direction completely opposite to the direction the player has in mind.

The accident of failing precise control of heading due to a moment of negligence by the operator in making judgment of orientation of the remote control of a model car is not unusual in the event of racing among players or a demolition operation by police/military demolition squad or any other occasion involving operation of remote controllable machinery.

SUMMARY OF THE INVENTION

The primary purpose of the present invention is to provide a method to control a motion heading at a receiving end by referring to an angle between the receiving end and a transmission end to solve the problem of failure of the receiving end in effective execution of an heading set up by the transmission end resulting in conflict of orientation of signals received by the receiving end and that an operator has in mind.

To achieve the purpose, the present invention includes the following steps:

Step A: Obtaining an angle, $\alpha$, which is between an original heading of the transmission end and a user inputted direction. The value of the obtained angle will be transmitted to the receiver as a command;

Step B: having a signal-receiving unit at the receiving end to pick up signals sent from the transmission end;

Step C: determining a signal source orientation according to strength of the signals received by the signal-receiving unit which comprises multiple sensors arranged in a form to pick up the signals from the transmission end;

Step D: solving an angle, $\beta$, between the signal source orientation and an original motion heading of the receiving end; and;

Step E: solving a new motion heading according to $\alpha+\beta-180$.

Preferably, the signal-receiving unit receives the signals from the transmission end by means of multiple sensors.

Preferably, the signal-receiving unit receives the signals from the transmission end by means of a position sensitive device.

Preferably, the signal-receiving unit is arranged in a circular form.

Preferably, the signal-receiving unit is arranged in a polygonal form.

Preferably, a transmission interface between the transmission end and the receiving end is wireless signal.

Preferably, the transmission interface is infrared, wireless electric wave, light wave, or sound wave.

The present invention provides the following advantages:

1. It is not necessarily for the transmission end attempting to control advancing heading of the receiving end to take an original motion heading of the receiving end; instead, it forthwith selects an angle to directly drive the receiving end to transfer to the orientation set up by the transmission end.

2. Multiple sensors or a position sensitive device of the signal-receiving unit arranged in a circular or polygonal form allow the receiving end to pick up the strongest signals exactly in the same advancing orientation of the transmission end.

3. The present invention makes the remote control easier, more convenient and more operator-friendly.

4. The present invention prevents accident due to error in making judgment of the orientation at the receiving end.

DETAILED DESCRIPTION OF THE PREFERRED EMBODIMENTS

Figure 1:
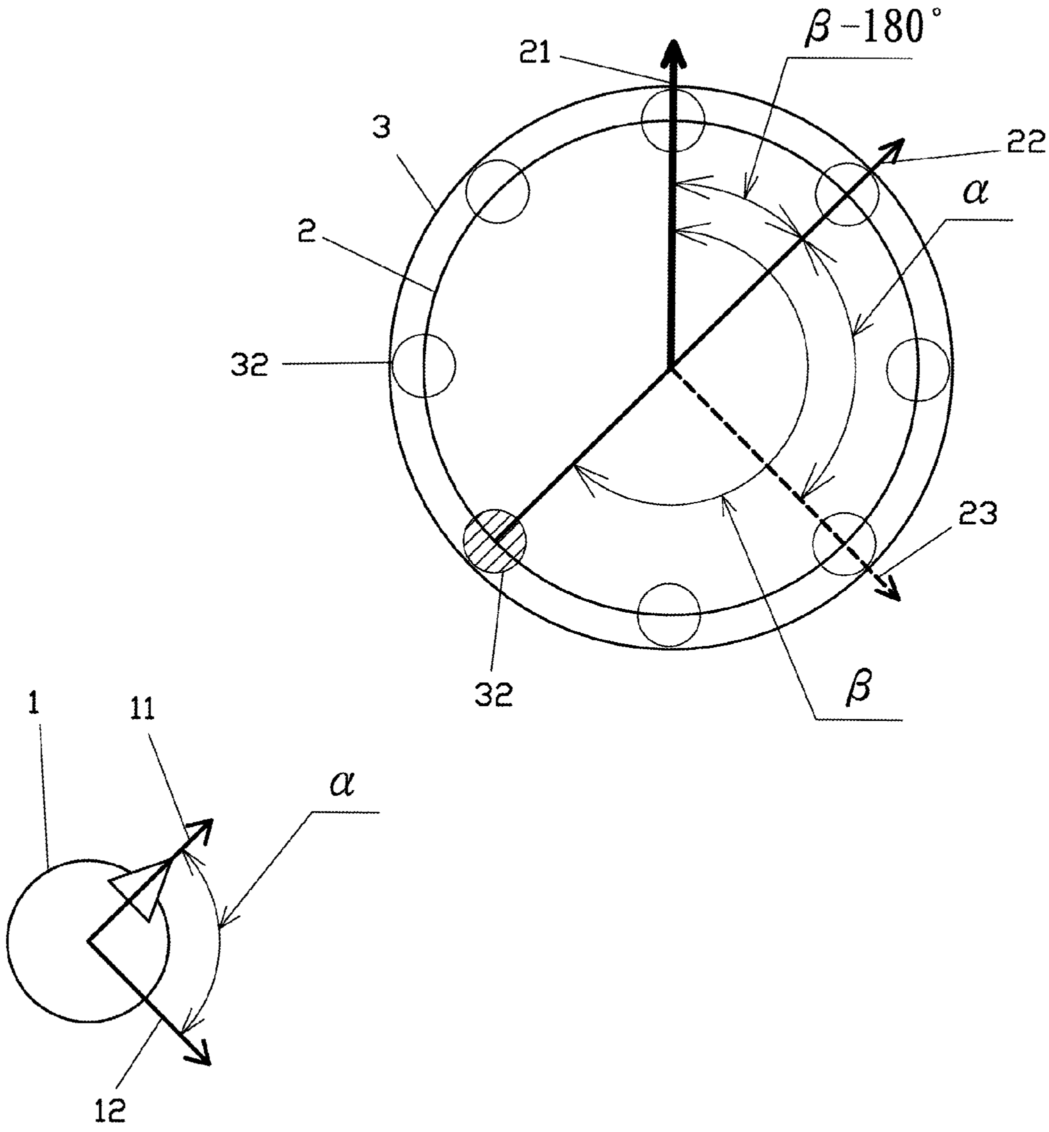
FIG. 1 is a schematic view showing a new motion heading generated by a receiving end in receiving signals from a transmission end of a first preferred embodiment of the present invention.
Figure 1A:
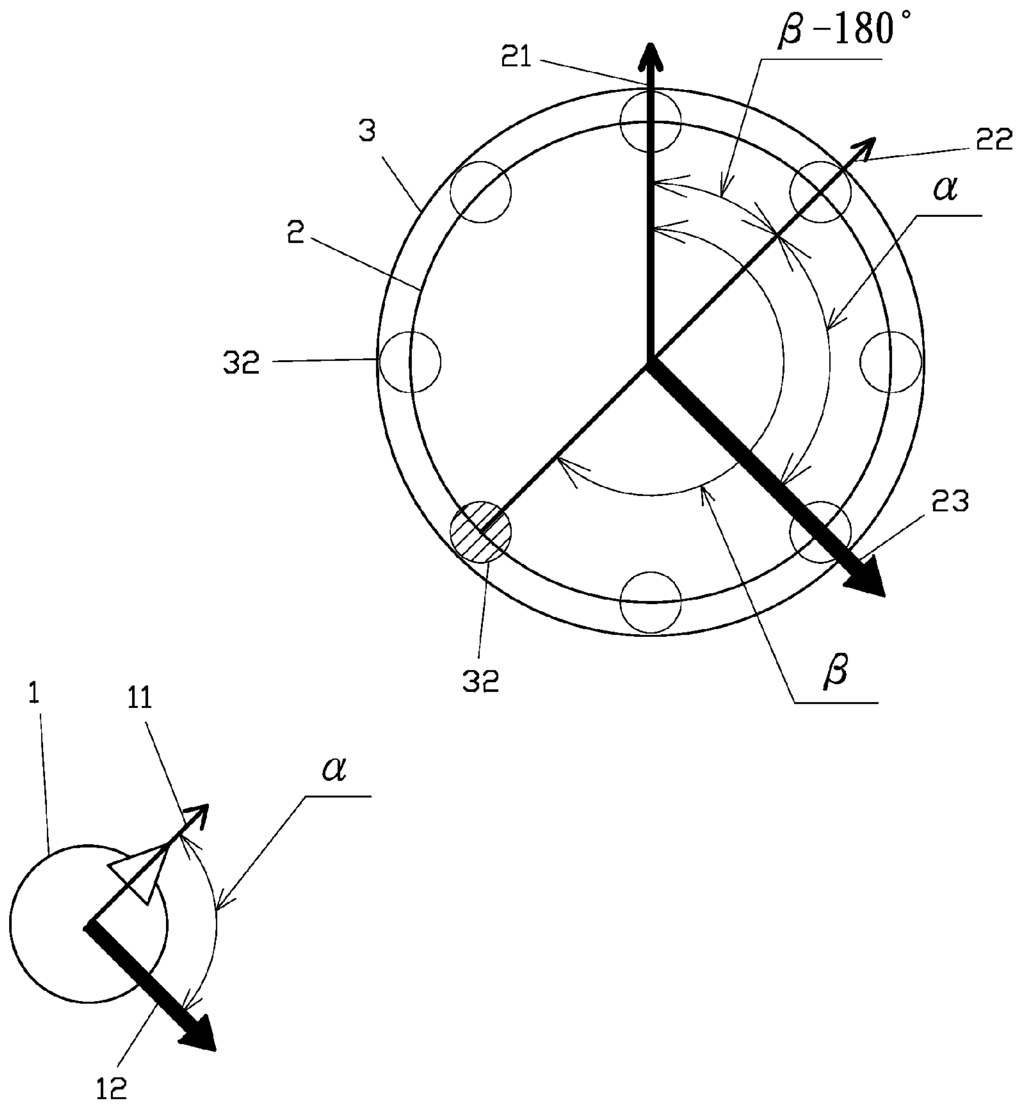
Figure 2:
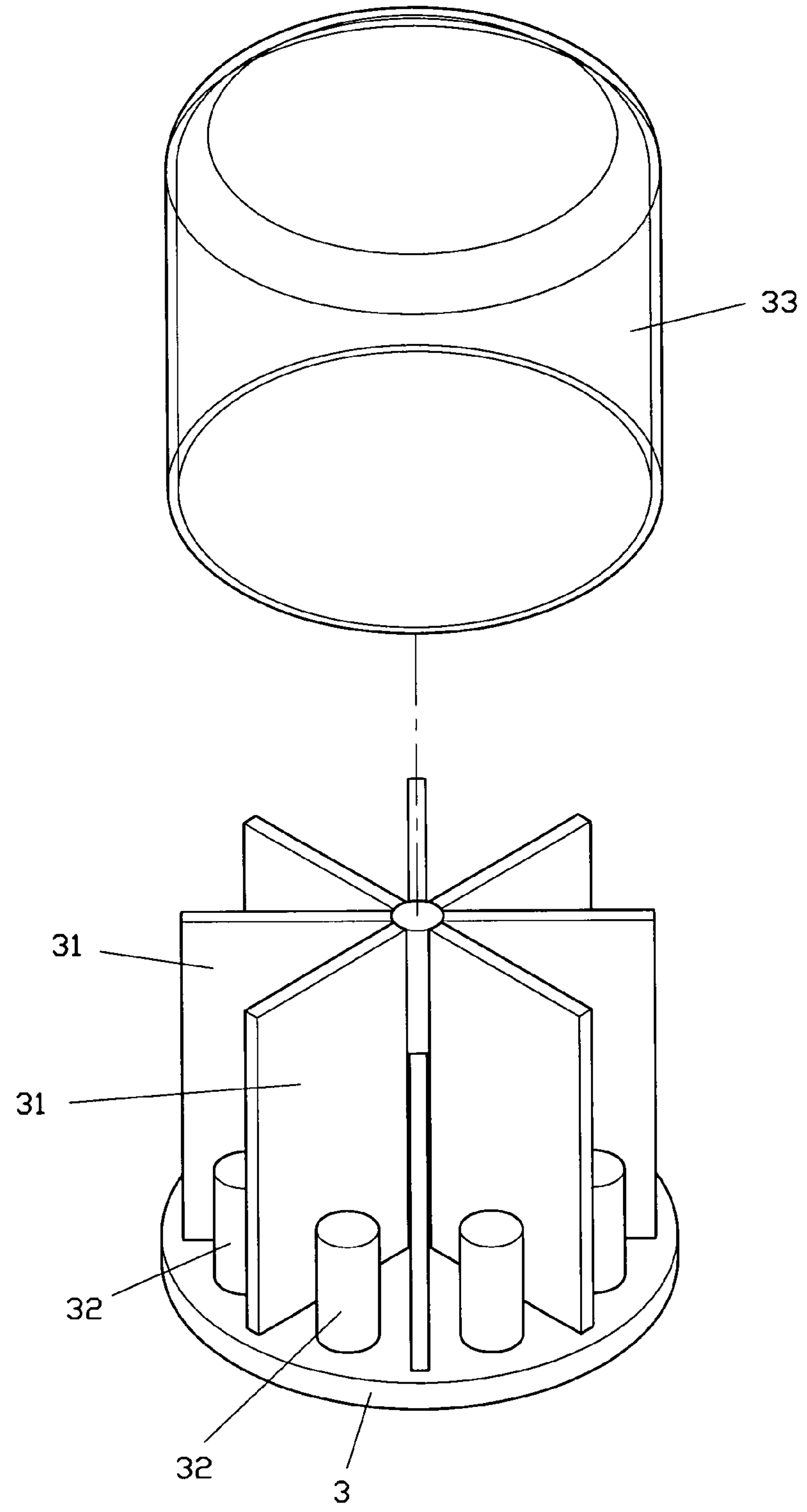
FIG. 2 is an exploded view of a signal-receiving unit of the first preferred embodiment of the present invention.
Figure 3:
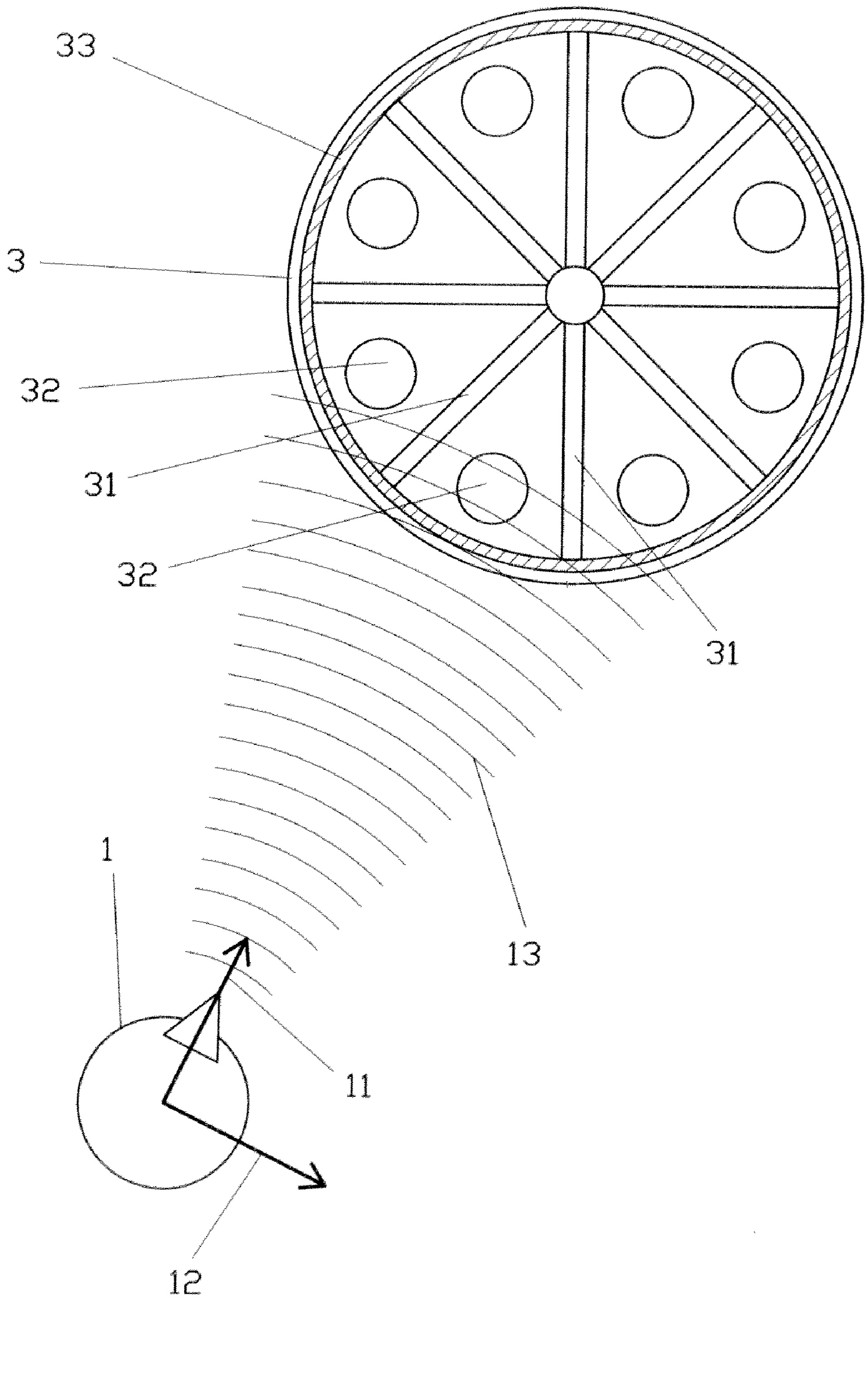
FIG. 3 is a schematic view showing a status of receiving signals by the signal-receiving unit at the receiving end of the first preferred embodiment of the present invention.

Referring to FIGS. 1, 2 and 3 for a first preferred embodiment of the present invention, a method to control a motion heading at a receiving end by referring to an angle between a receiving end and a transmission end comprises the following steps:

Obtaining an angle, $\alpha$, which is between an original heading (11) of the transmission end (1) and a user inputted direction (12). The value of the obtained angle will be transmitted to the receiver as a command;

establishing a signal-receiving unit (3) at a receiving end (2) to pick up signals (13) (the angle $\beta$) sent from the transmission end (1);

determining a signal source orientation (22) according to strength of the signals (13) received by the signal-receiving unit (3) which comprises multiple sensors (32) or a position sensitive device (not shown in the drawings) arranged in a form that is sufficient to pick up the signals (13);

solving an angle, β, between the signal source orientation (22) and an original motion heading (21) of the receiving end (2);

solving a new motion heading (23) according to the angles α and β; solving α+β−180° as the new motion heading (23) for the receiving end (2).

As illustrated in FIG. 1, the transmission end (1) is located at left behind the receiving end (2); the original heading (11) of the transmission end (1) faces the receiving end (2); the user inputted direction (12) relates to a direction the receiving end (2) desires to advance; and an included angle α is defined between the original heading (11) and the user inputted direction (12) (90° as illustrated in the first preferred embodiment). Another included angle, β, is defined (225° as illustrated in the first preferred embodiment) between the original motion heading (21) of the receiving end (2) and the signal source orientation (22) picked up at the receiving end (2). A formula to solve a new motion heading (23) of the receiving end (2) is α+β−180°, that is 90°+225°−180°=135°. The solved angle will be executed when the transmission end (1) turns for an angle of 135° or a tail of the model car reverses in a direction of 45°; and the new motion heading (23) (the advancing heading) becomes identical with the user inputted direction (12) as directed by the transmission end (1).

As illustrated in FIG. 1, the strongest signal (13) received takes place at a sensor (32) located to the left back; therefore, the signal source orientation (22) picked up at the receiving end (2) from the original heading (11) of the transmission end (1) enters from a position of the sensor (32) (shadowed area in a circle representing the sensor in solid line) to define the included angle β with the original motion heading (21) of the receiving end (2).

Now referring to FIG. 2, the receiving end (2) of the present invention is provided with the signal-receiving unit (3). The signal-receiving unit (3) contains multiple portioning plates (31) arranged in radius, each inter-region between every two abutted partitioning plates (31) is provided with a sensor (32) before all the partitioning plates (31) are covered with a canopy (33) to realize better signal ratio though judging signal strength is feasible without partitioning plates (31) and the canopy (33). However it is to be noted that the preferred embodiments disclosed in the specification are not limiting the present invention, e.g., a position sensitive device (PSD) may function as a signal-receiving unit, or any construction, installation, or characteristics that is same or similar to that of the present invention should fall within the scope of the purposes and claims of the present invention.

As illustrated in FIG. 3, the sensor (32) receives the signals (13) sent from the original heading (11) of the transmission end (1). Whereas the sensor (32) is segregated by means of the partitioning plates (31), the sensor (32) facing the signals (13) receives the strongest signals (13) while the signals (13) induced by other sensor (32) on both sides of the sensor (32) directly facing the signals (13) become decreasingly weaker or prevented from reaching them due to blockage by the partitioning plates (31). Heading and position of the transmission end (1) are determined according to strength of the signals (13) induced by the sensor (32) to perform computation in designed an angle the transmission end (1) should be adjusted for to ensure that the advancing heading of the receiving end (2) is same as the user inputted direction (12) as instructed by the transmission end (1).

Figure 4:
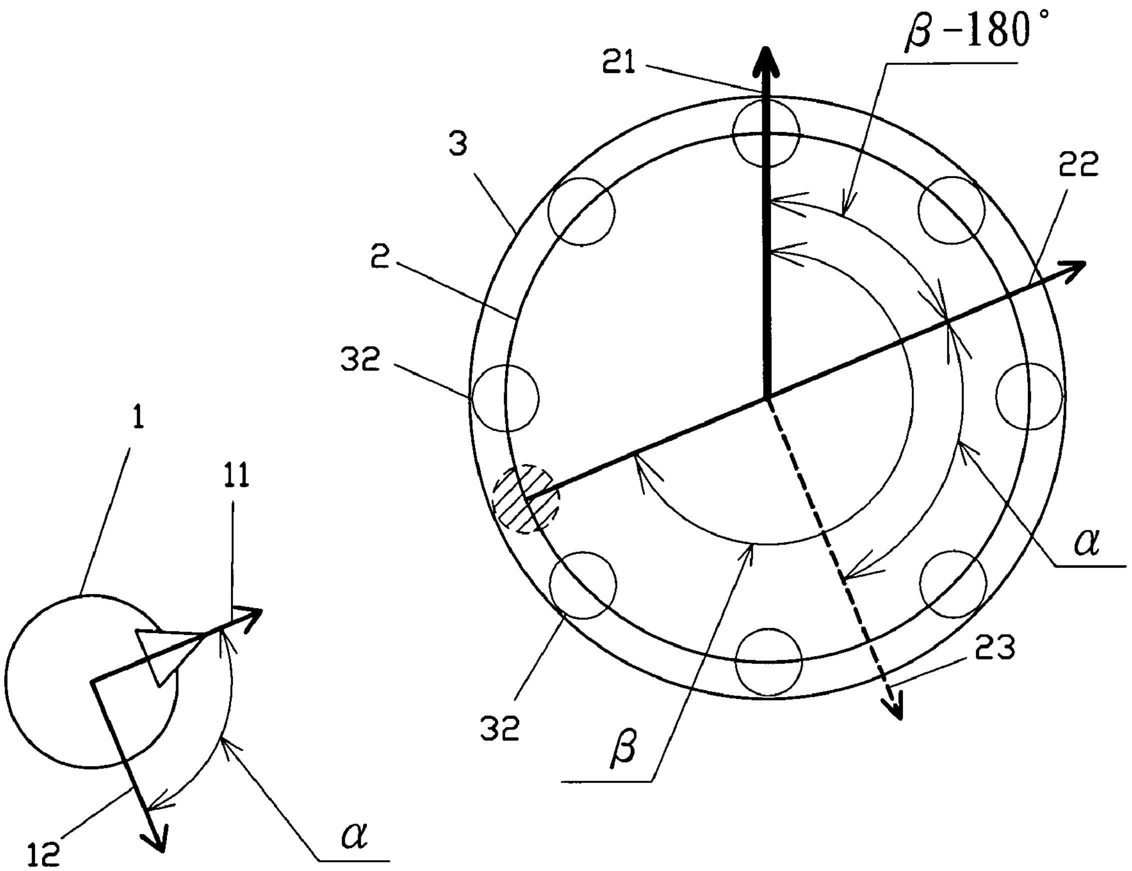
FIG. 4 is a schematic view showing that a new motion heading is generated by the receiving end in receiving signals from the transmission end after a displacement of the transmission end and the receiving end of the first preferred embodiment of the present invention.

The transmission end (1) is located at left behind the receiving end (2) as illustrated in FIG. 4 by moving upward for an angle of 22.5° compared to that as illustrated in FIG. 1. The transmission end (1) is located at left behind the receiving end (2); the user inputted direction (12) relates to a direction the receiving end (2) desires to advance; and an included angle α is defined between the original heading (11) and the user inputted direction (12) (90° as illustrated in the first preferred embodiment). Another included angle, β, is defined (247.5° as illustrated in the first preferred embodiment) between the original motion heading (21) of the receiving end (2) and the signal source orientation (22) sent from the original heading (11) of the transmission end (1) picked up at the receiving end (2). The formula to solve a new motion heading (23) of the receiving end (2) is α+β−180°, that is 90°+247.5°−180°=157.5°. The solved angle will be executed when the transmission end (1) turns for an angle of 157.5°; and the new motion heading (23) (the advancing heading) becomes identical with the user inputted direction (12) as directed by the transmission end (1).

As illustrated in FIG. 4, the strongest signal received takes place at where between the sensor (32) in lower left and another sensor (32) in the left; therefore, the signal source orientation (22) picked up at the receiving end (2) from the original heading (11) of the transmission end (1) enters from a position of the sensor (32) (shadowed area in a circle representing the sensor in dotted line) to define the included angle β with the original motion heading (21) of the receiving end (2).

According to the signal source orientation (22) as illustrated in FIGS. 1 and 4, the original heading (11) of the transmission end (1) received by the sensor (32), where the strongest signal picked up may become an advancing route for the signal source orientation (22) other than direct entrance from the sensor (32); and the included angle β solved from the angle where admits the strongest signal is the most accurate.

Figure 5:
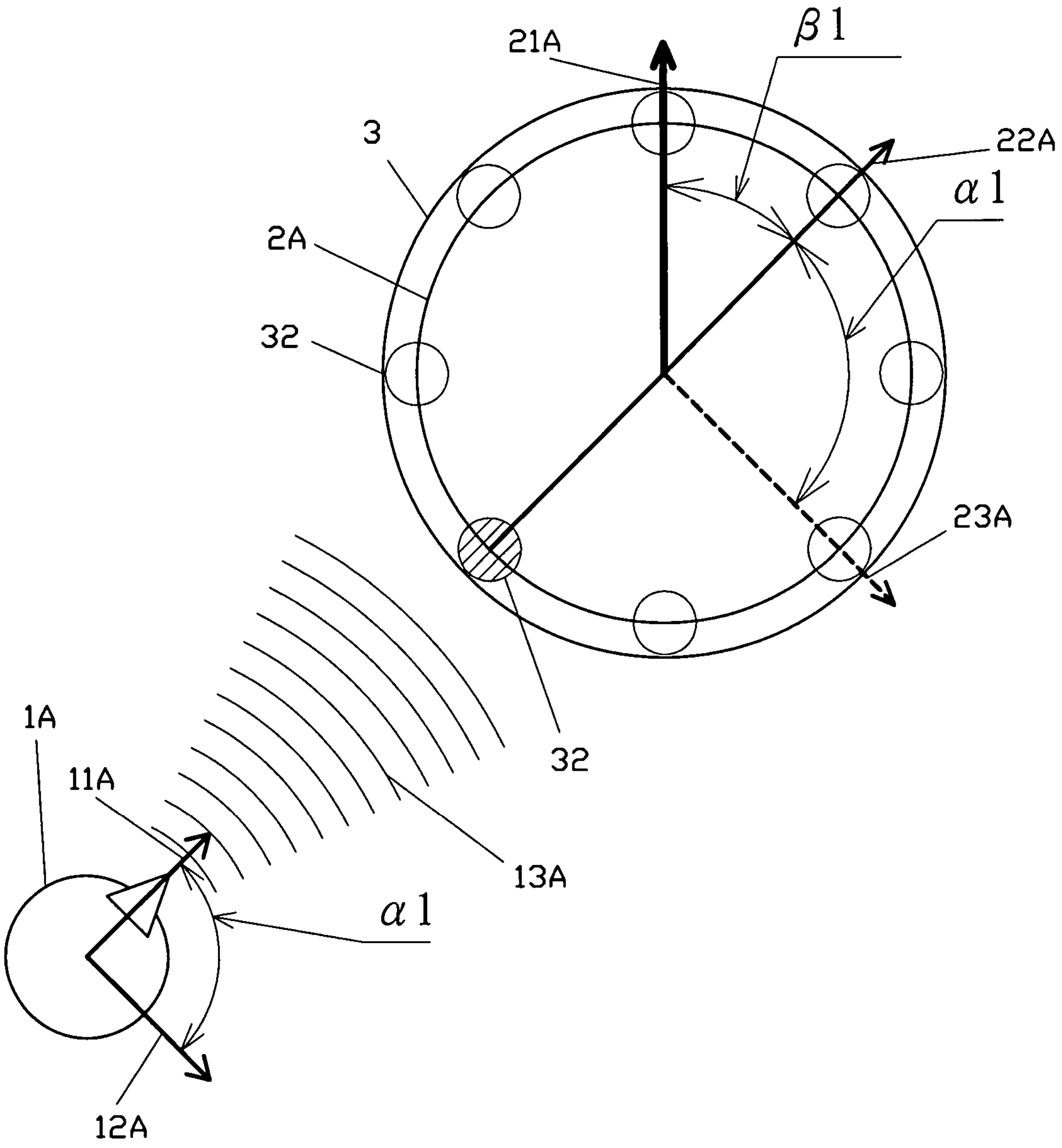
FIG. 5 is a schematic view showing a new motion heading generated by a receiving end in receiving signals from a transmission end of a second preferred embodiment of the present invention.

A second preferred embodiment of the present invention as illustrated in FIG. 5 comprises the following steps:

Step A: solving an included angle, al, between an original heading (11A) and a user inputted direction (12A) of a transmission end (1A);

Step B: having a signal-receiving unit (3) at a receiving end (2A) to pick up signals (13A) sent from the original heading (11A) of the transmission end (1A);

Step C: determining a signal source orientation (22A) according to strength of the signals (13A) received by the signal-receiving unit (3);

Step D: solving another included angle, β1, between the signal source orientation (22A) and an original motion heading (21A) of the receiving end (2A); and Step E: having α1 and β1 as a new motion heading (23A) for the receiving end (2A).

As illustrated in FIG. 5, multiple sensors (32) are provided in the signal-receiving unit (3) to pick up signals transmitted from the transmission end (1A). As illustrated, the transmission end (1A) is located at left behind the receiving end (2A); the original heading (11A) of the transmission end (1A) faces the receiving end (2A); the user inputted direction (12A) relates to a direction the receiving end (2A) desires to advance; and an included angle α1 is defined between the original heading (11A) and the user inputted direction (12A) (90° as illustrated in the second preferred embodiment). Another included angle, β1, is defined (45° as illustrated in the second preferred embodiment) between the original motion heading (21A) of the receiving end (2A) and the signal source orientation (22A) picked up at the receiving end (2A). A formula to solve a new motion heading (23A) of the receiving end (2) is α1+β1, that is 90°+45°=135°. The solved angle will be executed when the transmission end (1A) turns for an angle of 135°; and the new motion heading (23A) (the advancing heading) becomes identical with the user inputted direction (12A) as directed by the transmission end (1A).

Similar to the first preferred embodiment, the second preferred embodiment has where the strongest signal received as an advancing route of the signal source orientation (22A) and solves the included angle β1 according to the angle where admits the strongest signal.

Whereas each relative position among the sensors are known, any sensor at any other position that where the strongest signal is received can also become a reference point for solving heading, e.g., the sensor picking up the weakest signal, the second weakest signal, the second strongest signal, etc.

The multiple sensors respectively provided in the first and the second preferred embodiments of the present invention are arranged each in circular form; however, they can be arranged in any other equivalent surrounding or matrix form.

Furthermore, a transmission interface between the transmission end and the receiving end in the first or the second preferred embodiment is wireless signal including but not limited to infrared, wireless electric wave, light wave or sound wave.

What is claimed is:

1. A method for controlling a motion heading at a receiving end of a remotely controlled object, comprising the following steps:

establishing a signal-receiving unit at the receiving end to pick up signals sent from a transmission end, said signal-receiving unit comprising multiple sensors to receive the signals from the transmission end, said multiple sensors arranged in a circular or polygonal form;

transmitting signals from the transmission end corresponding to a user inputted direction change relative to an orientation of the transmission end;

determining the orientation of the transmission end with respect to a motion heading of the receiving end, according to a strength of the signals received by the multiple sensors of the signal-receiving unit transmitted from the transmission end;

getting at the receiving end an angle, α, a command angle between the user inputted direction change and the orientation of the transmission end;

determining an angle, β, between the orientation of the transmission end and said motion heading of the receiving end; wherein β is determined with respect to a reference point where the strength of said received signals of the multiple sensors are highest; and determining a new motion heading of the receiving end according to an angle a $\alpha+\beta-180°$.

2. The method as claimed in claim 1, wherein the signal-receiving unit comprises a position sensitive device.

3. The method as claimed in claim 1, wherein the transmission interface is infrared light, wireless electric waves, visible light or sound waves.

4. A method for controlling a motion heading at a receiving end of a remotely controlled object, comprising the following steps:

establishing a signal-receiving unit at the receiving end to pick up signals sent from a transmission end, said signal-receiving unit comprising multiple sensors to receive the signals from the transmission end, said multiple sensors arranged in a circular or polygonal form;

transmitting signals from the transmission end corresponding to a user inputted direction change relative to an orientation of the transmission end;

determining the orientation of the transmission end with respect to a motion heading of the receiving end, according to a strength of the signals received by the multiple sensors of the signal-receiving unit transmitted from the transmission end;

getting at the receiving end an angle, α, a command angle between the user inputted direction change and the orientation of the transmission end;

determining an angle, β, between the orientation of the transmission end and said motion heading of the multiple sensors of the receiving end; and determining a new motion heading of the receiving end according to an angle a $\alpha+\beta$.

5. The method as claimed in claim 1, wherein the signal-receiving unit is covered with a canopy.

6. The method as claimed in claim 4, wherein said signal-receiving unit includes a plurality of partitioning plates isolating signals received at each of said sensors.

7. A method for controlling a motion heading at a receiving end of a remotely controlled object, comprising the following steps:

establishing a signal-receiving unit at the receiving end to pick up signals sent from a transmission end, said signal-receiving unit comprising multiple sensors to receive the signals from the transmission end, said multiple sensors arranged in a circular or polygonal form;

transmitting signals from the transmission end corresponding to a user inputted direction change relative to an orientation of the transmission end;

determining the orientation of the transmission end with respect to a motion heading of the receiving end, according to a strength of the signals received by the multiple sensors of the signal-receiving unit transmitted from the transmission end;

getting at the receiving end an angle, α, a command angle between the user inputted direction change and the orientation of the transmission end;

determining an angle, β, between the orientation of the transmission end and said motion heading of the receiving end; wherein β is determined with respect to a reference point where the strength of said received signals of the multiple sensors are highest; and determining a new motion heading of the receiving end according to an angle $\alpha+\beta-180°$;

wherein said signal-receiving unit includes a plurality of partitioning plates isolating signals received at each of said sensors.

* * * * *